United States Patent
Ekkert

(10) Patent No.: US 9,211,979 B2
(45) Date of Patent: Dec. 15, 2015

(54) SLITTING TOOL

(71) Applicant: Phoenix Closures, Inc., Naperville, IL (US)

(72) Inventor: Len Ekkert, Lemont, IL (US)

(73) Assignee: Phoenix Closures, Inc., Naperville, IL (US)

( * ) Notice: Subject to any disclaimer, the term of this patent is extended or adjusted under 35 U.S.C. 154(b) by 69 days.

(21) Appl. No.: 14/024,194

(22) Filed: Sep. 11, 2013

(65) Prior Publication Data

US 2015/0069007 A1      Mar. 12, 2015

(51) Int. Cl.
*B65D 41/34* (2006.01)
*B26D 1/00* (2006.01)
*B26F 1/20* (2006.01)
*B29L 31/56* (2006.01)
*B29C 45/00* (2006.01)

(52) U.S. Cl.
CPC ............. *B65D 41/3428* (2013.01); *B26D 1/00* (2013.01); *B26F 1/20* (2013.01); *B29C 45/0053* (2013.01); *B29C 2793/009* (2013.01); *B29C 2793/0054* (2013.01); *B29L 2031/565* (2013.01)

(58) Field of Classification Search
CPC ........... B65D 41/3409; B65D 41/3457; B65D 41/34; B65D 41/348
USPC ....................................................... 215/252
See application file for complete search history.

(56) References Cited

U.S. PATENT DOCUMENTS

| 3,824,941 | A | | 7/1974 | Hannon |
| 3,861,551 | A | | 1/1975 | Hannon |
| 4,397,597 | A | | 8/1983 | King |
| 4,904,435 | A | * | 2/1990 | Babcock et al. ............... 264/154 |
| 5,809,860 | A | | 9/1998 | Haaser |
| 6,817,276 | B1 | * | 11/2004 | Kowal ............................. 83/881 |
| 7,264,131 | B2 | * | 9/2007 | Tsutsumi ............. B65D 41/325 215/252 |
| 7,314,146 | B2 | * | 1/2008 | Mavin ........................... 215/307 |
| 7,673,543 | B2 | | 3/2010 | Albonetti |
| 2006/0175281 | A1 | * | 8/2006 | Ekkert ............... B65D 41/3457 215/252 |
| 2007/0089587 | A1 | | 4/2007 | Liao |

* cited by examiner

*Primary Examiner* — Anthony Stashick
*Assistant Examiner* — Raven Collins
(74) *Attorney, Agent, or Firm* — Husch Blackwell, LLP

(57) ABSTRACT

A tamper-evident closure is disclosed, having a skirt, threads on an interior of the skirt, and a tamper-evident band secured to the closure body by frangible bridges along a circumferential lower surface of the closure. The band and the closure have a plurality of equidistant vertical upper and lower teeth along an interior wall. Further the subject invention includes a mandrel for use in cutting slits in tamper-evident closures. The mandrel is supported for rotational movement within a closure, and comprises a disc with a circumferential surface with a plurality of equidistant slots for meshing with complementary teeth on the interior surface of the closure.

9 Claims, 3 Drawing Sheets

SLITTING TOOL

FIELD OF THE INVENTION

This invention relates to closures and, in particular, to tamper-evident closures.

BACKGROUND OF THE INVENTION

In general, one provides a closure with tamper-evident capability by forming the skirt of the closure with a score line so as to define a removable marginal edge portion of the skirt as a security ring or band. The security ring can have a snap-engagement construction, which enables it to make a locking engagement with a bead of the container, so that when the closure is removed it severs along the score line, leaving the security band loose on the container clearly indicating that the closure has been removed, once the closure has been reapplied to the container.

When formed in plastics material the score line may be provided by a peripheral slit connected by a bridge of plastic material which is capable of tearing when the closure is first opened. Thus, the score line comprises about ten or more frangible bridges of small cross-sectional area which are spaced around the closure and separated by slits at which the plastics material of the skirt is severed completely through its thickness.

There are two methods for the formation of the score line in a plastics skirt. In one method the score line is molded into the skirt. However, such molding of the score line often requires complicated tool parts which are expensive.

The second method for forming the score line avoids the particular shortcomings of the first method. In this second method the score line is formed after the closure has been molded, usually by means of a knife to which the closure is presented. The knife must penetrate through the wall of the closure skirt to form the slits, and the skirt is support internally by a roller or other support member which is inserted into it.

One manner of using a knife to cut the slit is to insert a mandrel into the underside of the cap and bear against the tabs which have been folded against the inner side wall of the closure and rotating the cap through rotation of the mandrel. The knife is reciprocating and cuts spaced slits in the closure skirt with frangible bridges in between. However, the hold of the mandrel on the closure wall is not absolute and occasionally slips occur, causing irregular cutting of the slits in the tamper-evident band. Further the knife can and does cut into the tabs which provide support for the skirt wall during the cutting operation.

Therefore a benefit of the subject invention is a method and apparatus by which consistently spaced slits may be cut into a closure skirt, without harming the tabs.

SUMMARY OF THE INVENTION

A tamper-evident closure is disclosed, having a skirt, threads on an interior of the skirt, and a tamper-evident band secured to the closure body by frangible bridges along a circumferential lower surface of the closure. The band and the closure have a plurality of equidistant vertical upper and lower teeth respectively along an interior wall, with the upper teeth extending on the closure body from a location below the threads to a place adjacent the lower end of the skirt, and the lower teeth extending on the tamper-evident band downward from adjacent the circumferential lower surface of the skirt.

Further, the subject invention includes a mandrel for use in cutting slits in tamper-evident closures. The mandrel is supported for rotational movement within a closure, and comprises a disc having a thickness; the disc has a circumferential surface, and a plurality of equidistant slots on the circumferential surface for meshing with complementary teeth on an interior surface of the closure.

CONCISE DESCRIPTION OF THE DRAWINGS

This and other benefits together with additional features contributing thereto and advantages occurring therefrom, will be apparent from the following description of the invention when read in conjunction with the accompanying drawings, wherein.

DETAILED DESCRIPTION OF ONE EMBODIMENT OF THE INVENTION

Figure 1:
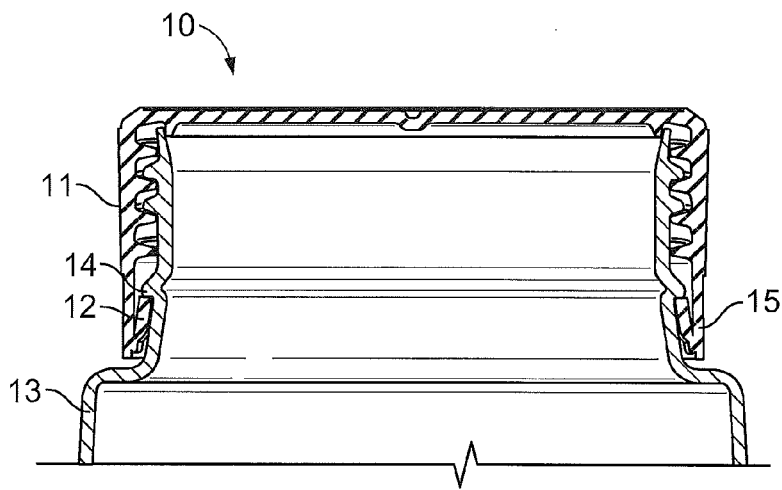
FIG. 1 is a cross section of a tamper evident closure with removable band.

While the present invention is susceptible of embodiment in various forms, there is shown in the drawings a presently preferred embodiment that is discussed in great detail hereafter. It should be understood that the present disclosure is to be considered as an exemplification of the present invention, and is not intended to limit the invention to the specific embodiments illustrated. It should be further understood that the title of this section of this application ("Detailed Description of one Embodiment of the Invention") relates to a requirement of the United States Patent Office, and should not be found to limit the subject matter disclosed herein.

An embodiment of the invention is now described in detail. Referring to the drawings, like numbers indicated like parts throughout the views. As used in the description herein and throughout the claims, the following terms take the meanings explicitly associated herein, unless the context clearly dictates otherwise: the meaning of "a", "an", and "the" includes plural reference, the meaning of "in" includes "in" and "on".

FIG. 1 shows a typical tamper evident closure 10 having a skirt 11, with individual tabs or a continuous band 12 that, in a typical circumstance when in place on the container 13, are in contact with container bead 14, thereby preventing removal of the closure 10 from the container 13 unless the tamper-evident band 15 is torn from the closure 10 and remains on the container 13 while the closure 10 is removed. When this happens, a user would know that the container has been opened.

Figure 2:
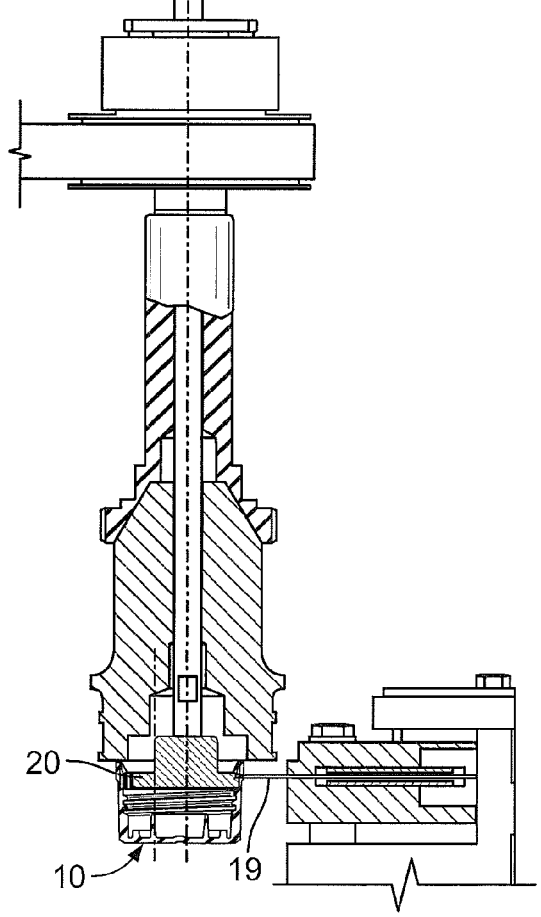
FIG. 2 is a cross section of a mandrel presenting a closure for slitting according to the subject invention.
Figure 3:
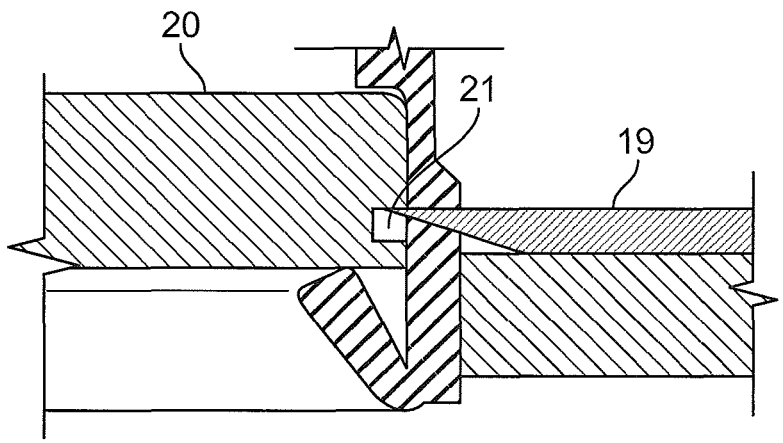
FIG. 3 is a partial cross section of a brief cutting a slit against the support of the mandrel.
Figure 4:
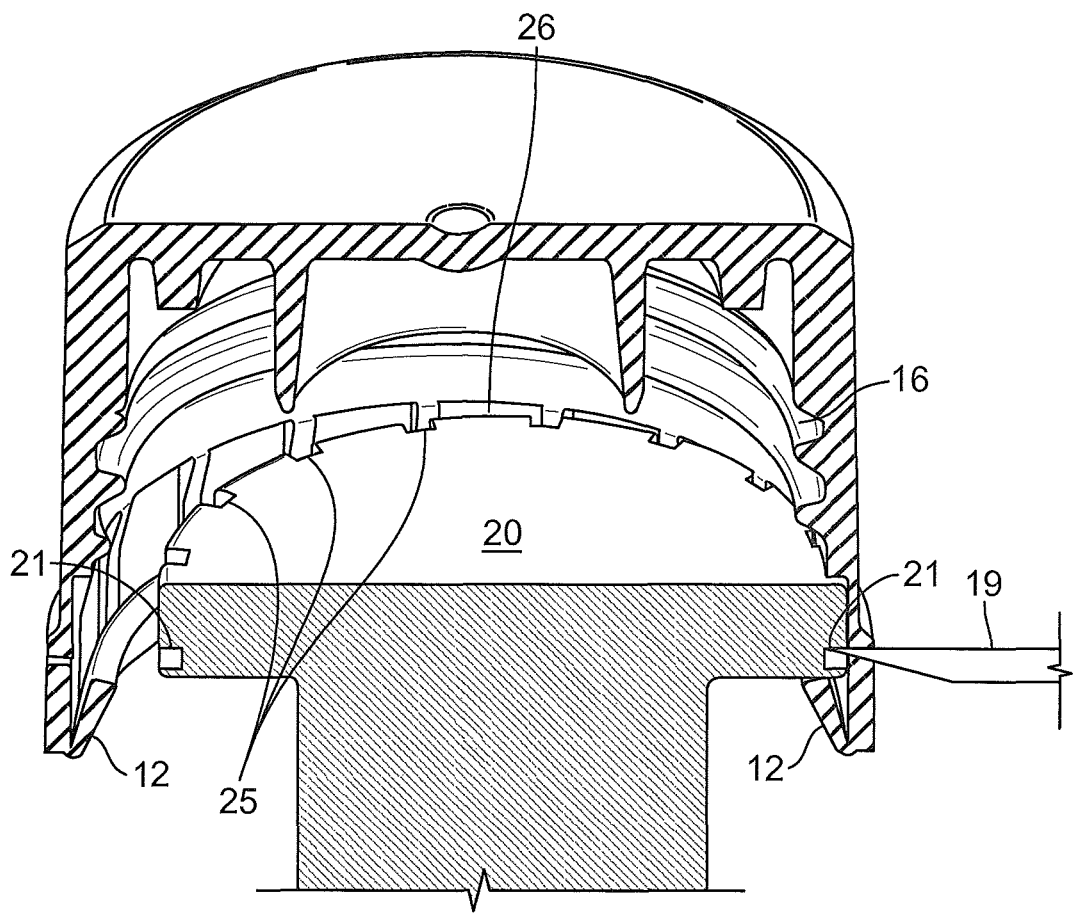
FIG. 4 is a cross section of the mandrel showing the engagement of the bridges of the closure.
Figure 5:
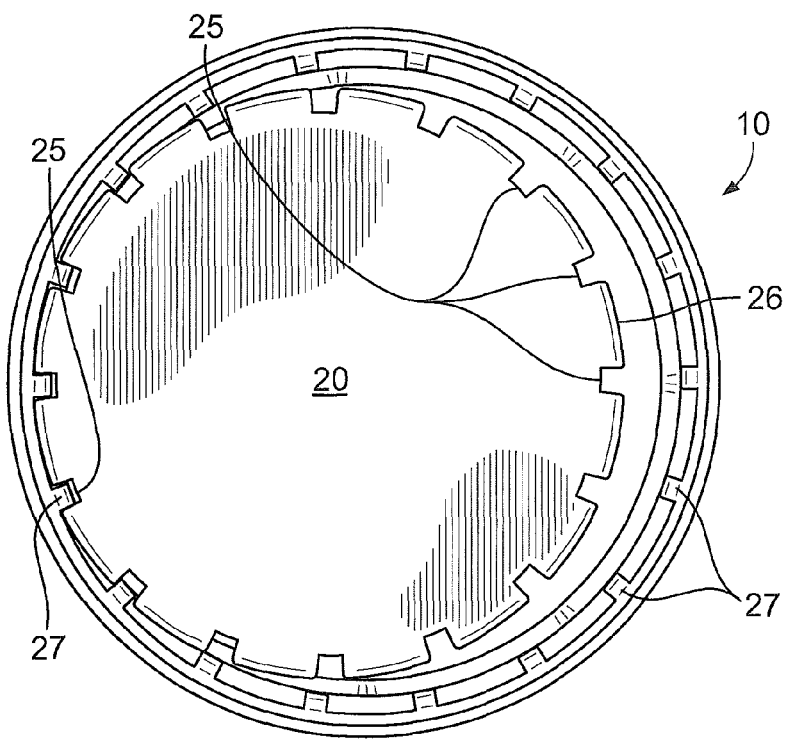
FIG. 5 is a top view of the cross section of FIG. 4.
Figure 6:
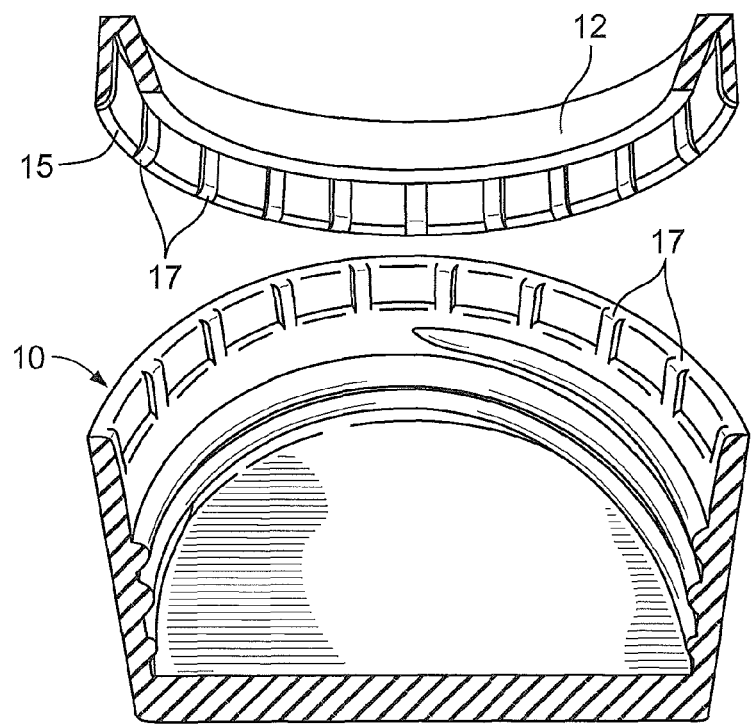
FIG. 6 is a cross-section cut view of the tamper band of the closure of the subject invention.

As shown in FIG. 2 in the method and apparatus of the subject invention, a mandrel 20 is provided. The mandrel 20 has a smaller diameter than the interior diameter of the closure 10, including the folded in tabs or tamper band 12 which is to be slit, so that the mandrel can easily be inserted into the closure, past the bent lugs (FIGS. 4 & 5) without touching or deforming them. The mandrel 20 is a disc-shaped tool with a thick periphery. At a point spaced from the bottom is a horizontal channel 21 that allows a knife 19 to penetrate the skirt wall without damaging the mandrel (FIGS. 3 & 4). The mandrel is positioned above and spaced from the tabs 12, and pressed against at least one location of the skirt interior wall. As the mandrel rotates, the closure follows in rotational motion. A plurality of vertical equidistant slots 25 are formed in the circumferential periphery 26 of the mandrel 20. These slots are of a size and position on the mandrel as will mesh with corresponding and cooperating teeth or bridges 27 formed on the interior of the closure skirt and the tamper-evident band. The mandrel or the closure is shifted to engage the slots of the mandrel to the bridges on the closure. The closure or the knife is then moved linearly to cut partially through the skirt to create a slit in the skirt wall. The rotation of the mandrel precisely drives the closure so that a reciprocating knife 30 can create precise, reproducible slits in the closure skirt every time. More specifically, the closure skirt interior has equidistant vertical teeth or bridges 17 which extend from below the threads 16 of the closure to below the slit 16 above the band 15. The relative motion of the knife vis-à-vis the closure is timed so that the knife cuts the slits adjacent and between the bridges. The bridges 17 are sufficiently thin that they are torn by the rotation of the closure when opening. Each bridge maintains the same thickness on the interior wall of the closure above and below slit 16.

The mandrel 20 has vertical slots 25 on its periphery that conform to the size and spacing of the bridges 17. The mandrel 20 is sufficiently smaller in size and outside diameter than the inside diameter of the closure with the tabs 12 folded up to allow insertion into the closure with the tabs folded up. The mandrel is thus positioned on the interior of the closure, above the tabs and pressed against the interior skirt of the closure. Thus, the slots of the mandrel can interlock with the teeth on the interior of the skirt wall, with the individual teeth 17 engaging the individual slots 25 at the point of contact of the mandrel circumference with the closure skirt interior. Rotation of the mandrel will then cause a precise following rotation of the closure. In the alternative, rotation of the closure will cause the mandrel to follow in rotational motion. The motion of the knife relative to the closure will then cut the slits precisely with equal spacing in every closure. As stated, the mandrel has a circumferential depression or slot 21 positioned to accept the knife when cutting the slits, thus there is no penetration of the knife into the mandrel.

It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

The invention claimed is:

1. A tamper-evident closure having a skirt, threads on an interior of said skirt, and a tamper-evident band secured to a closure body by frangible bridges along a circumferential lower surface of said skirt, said closure and said band each having a plurality equidistant vertical teeth respectively extending from an interior wall surface, said teeth extending on said interior of said skirt from a location below said threads to an interior of said tamper-evident band, and having a rectangular profile.

2. The tamper-evident closure of claim 1 wherein said teeth on said skirt and said teeth on said tamper evident band are vertically aligned.

3. The tamper-evident closure of claim 2 wherein said vertically aligned teeth form the frangible bridges.

4. A mandrel for use in cutting slits in tamper-evident closures, said mandrel being supported for contact with an interior surface of a closure, and comprising a disc having a thickness, and a circumferential exterior surface, said circumferential exterior surface having a plurality of equidistant vertical slots for meshing with complementary vertical teeth on the interior surface of the closure.

5. The mandrel of claim 4 wherein said closure include folded tabs, and said disc has an outside diameter smaller than the inside diameter of the folded tabs.

6. The mandrel of claim 4 wherein the closure rotates about the mandrel.

7. The mandrel of claim 4 wherein the mandrel rotates within the closure.

8. The mandrel of claim 4 wherein the circumferential surface of the disc has a horizontal slot.

9. A tamper-evident closure having a skirt, threads on an interior of said skirt, and a tamper-evident band secured to a closure body by frangible bridges along a circumferential lower surface of said skirt, said closure and said band each having a plurality of equidistant vertically aligned teeth respectively along an interior wall, said teeth extending on said interior of said skirt from a location below said threads to an interior of said tamper-evident band to form the frangible bridges.

* * * * *